Figure 14:
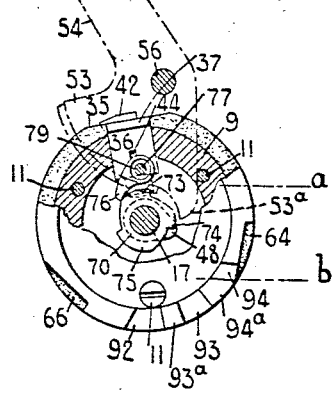

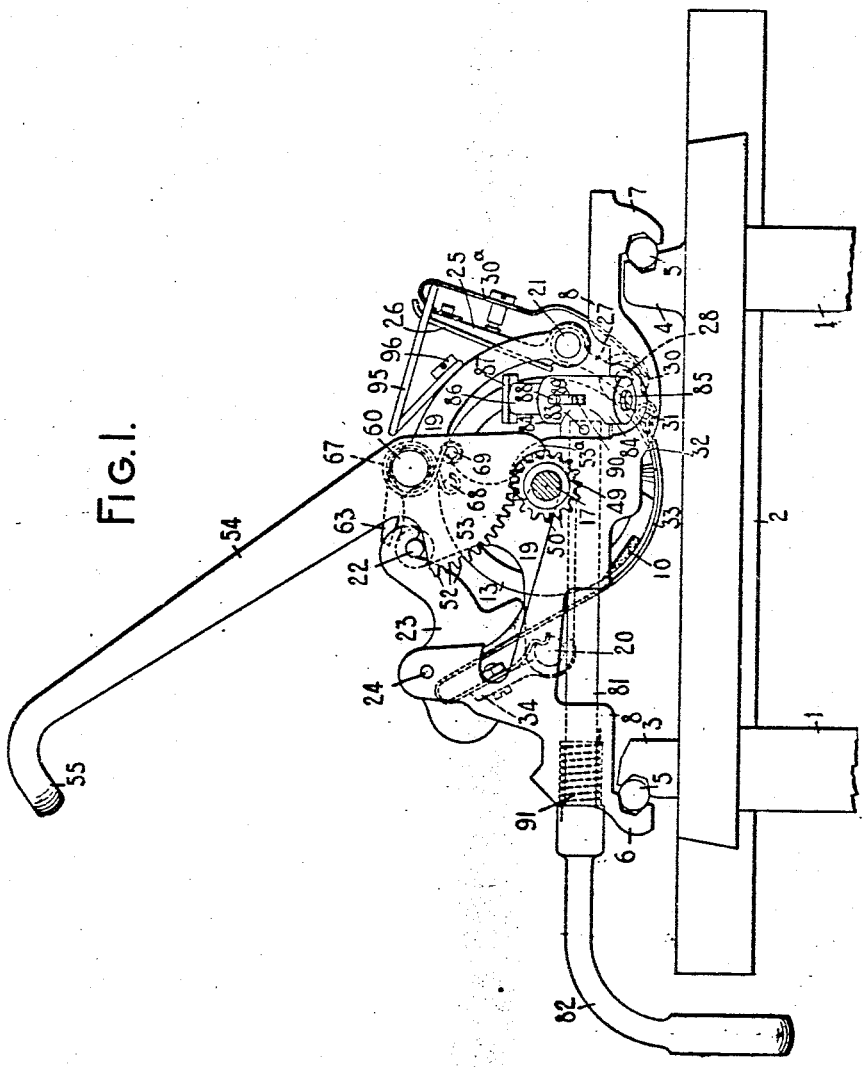

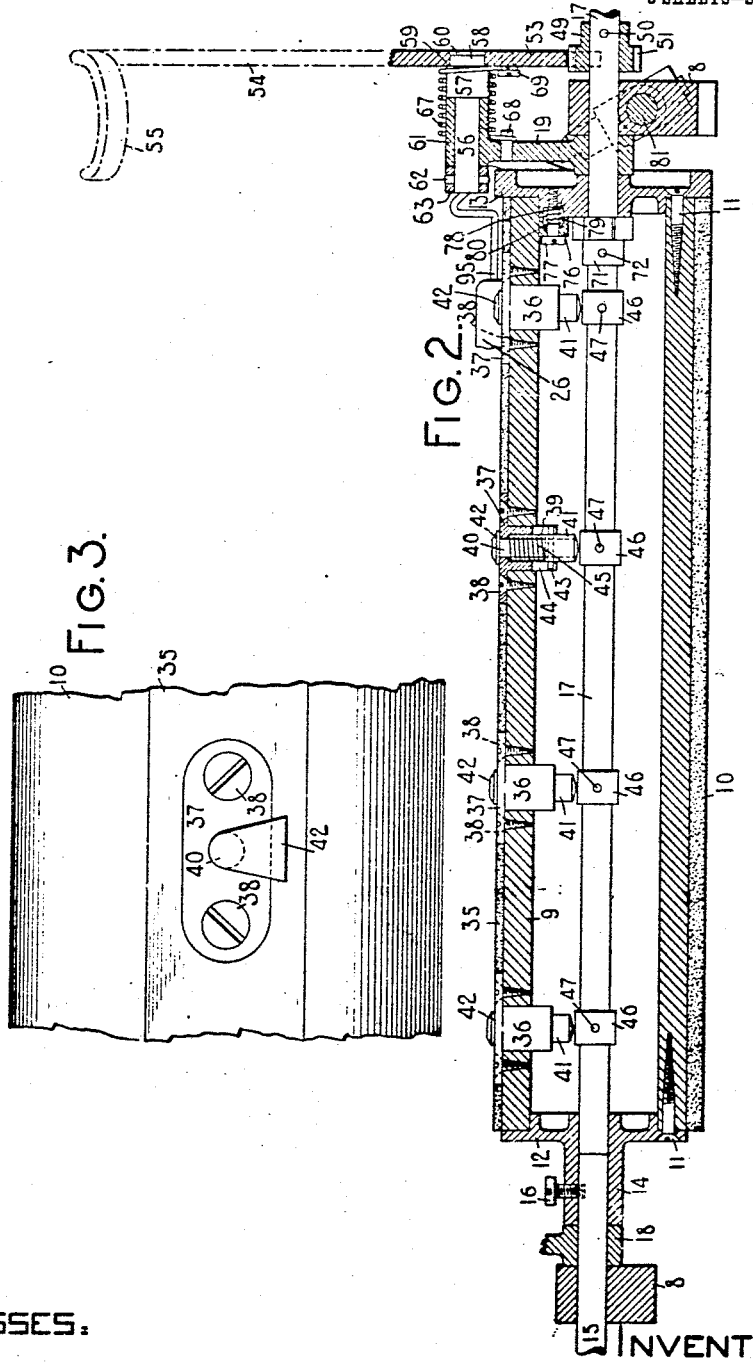

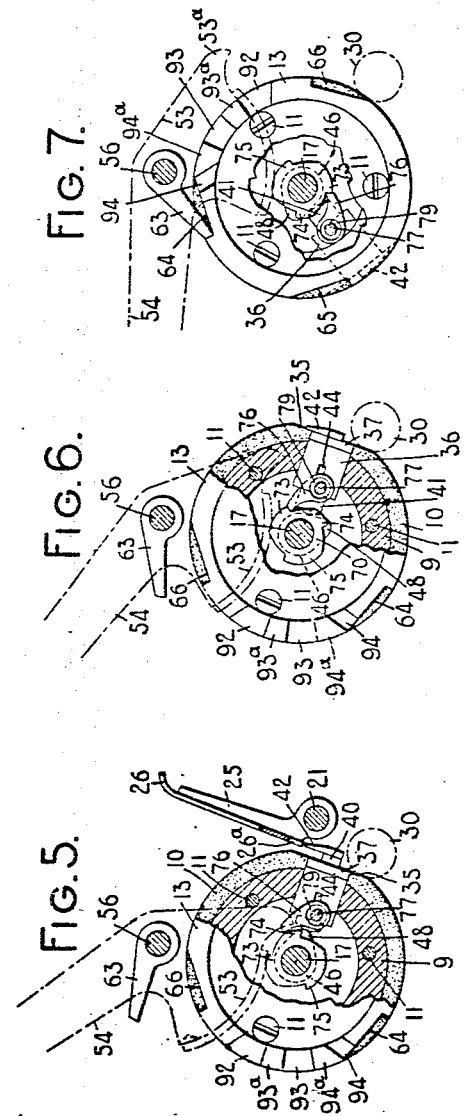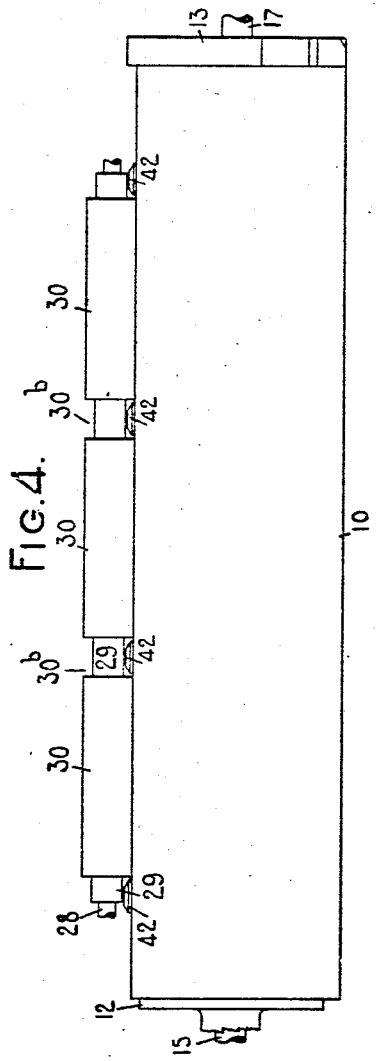

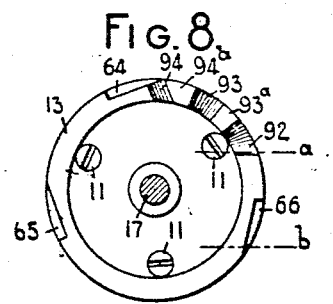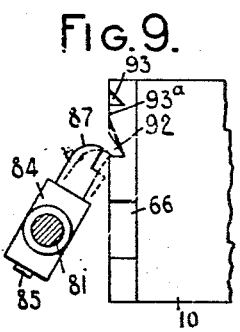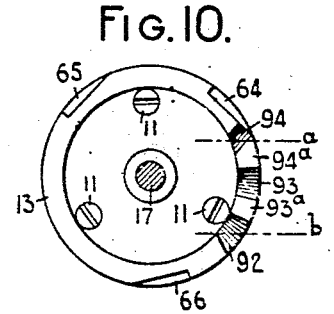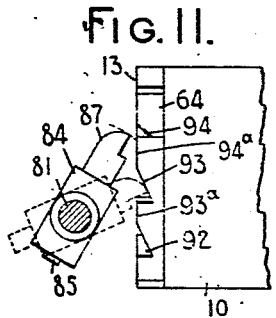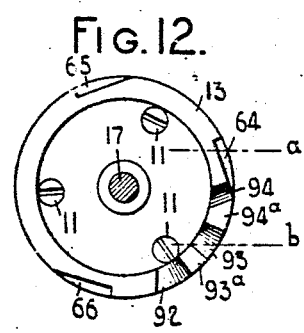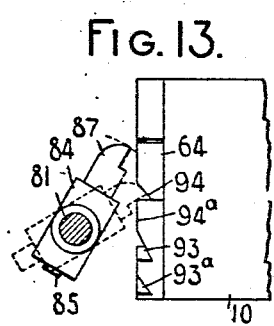

A. J. BRIGGS.
TYPE WRITING MACHINE.
APPLICATION FILED MAR. 16, 1907.

963,856.

Patented July 12, 1910.
5 SHEETS—SHEET 5.

WITNESSES:
J. B. Reeves
M. W. Pool

INVENTOR:
Arthur J. Briggs
By Jacob Felbel
HIS ATTORNEY

UNITED STATES PATENT OFFICE.

ARTHUR J. BRIGGS, OF SYRACUSE, NEW YORK, ASSIGNOR TO THE SMITH PREMIER TYPEWRITER COMPANY, OF SYRACUSE, NEW YORK, A CORPORATION OF NEW YORK.

TYPE-WRITING MACHINE.

963,856. Specification of Letters Patent. Patented July 12, 1910.

Application filed March 16, 1907. Serial No. 362,753.

*To all whom it may concern:*

Be it known that I, ARTHUR J. BRIGGS, citizen of the United States, and resident of Syracuse, in the county of Onondaga and State of New York, have invented certain new and useful Improvements in Type-Writing Machines, of which the following is a specification.

My invention relates especially to billing devices for typewriting machines and has for its principal object to provide improved devices of the character specified.

Another object of the invention is to provide improved automatic paper stop mechanism.

Another object is to provide an improved automatic paper clamping mechanism.

Another object is to provide improved line spacing devices.

To the above and other ends my invention consists in the features of construction, combinations of devices and arrangements of parts hereinafter described and particularly pointed out in the claims.

My invention is shown as applied to a Smith Premier typewriting machine, but it is to be understood that said invention may be adapted to other forms of writing machines.

In carrying out the invention in the present instance a platen having two axle sections is employed, one of said axle sections being maintained in a fixed relation with the platen and the other axle section being rotatable relatively to the platen. The platen carries a plurality or set of independently movable spring-pressed members which combine the functions of stops for that edge of the paper or work sheet first introduced into the machine, and of clamps for said work sheet. The stop and clamp members are actuated by cams arranged on the relatively rotatable axle section and said axle section may be rotated by means of a pinion fixed thereto and a coöperating hand-controlled gear segment pivoted on the platen carrier, said hand-controlled segment being in the nature of a supplementary line spacing lever. Connection between the platen and the relatively rotative axle section is made through a ratchet and pawl mechanism, the ratchet being fixed to said axle section and the pawl to the platen head, the result being that the hand-operated gear segment serves as a line spacing lever and in the course of its operation serves also to actuate the stop and clamp members. Rotative line spacing movements may also be communicated to the platen by the usual line space operating lever and pawl, said pawl being adapted to coöperate with crown ratchet teeth of novel form on the adjacent platen head.

By means of the mechanism above outlined I am enabled to automatically open the stop and clamp members to receive the bill or work sheet at a predetermined point in the rotation of the platen, after which the supplementary line spacing lever or hand-controlled gear segment is operated to clamp the bill by means of said clamping members and to turn or sweep the platen to a position for receiving the first line of writing on the bill. The subsequent turning movements of the platen to space between the lines of writing are preferably obtained by operating the usual line spacing lever, causing the usual line spacing pawl to coöperate with the crown ratchet teeth on the platen head. After the completion of the bill the supplementary line spacing lever may be operated to rapidly rotate the platen to the initial position, the combined clamp and stop members being automatically actuated so that the written bill is released and said members are properly positioned to coöperate with the next bill or work sheet as it is introduced into the machine.

My improvements and their mode of operation will be better understood from the more extended description and explanation to follow.

Figure 15:
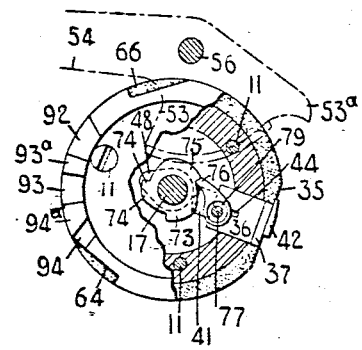
Figure 16:
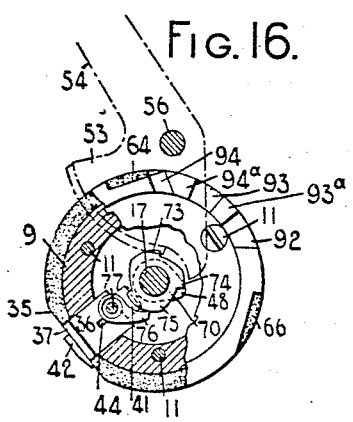
Figure 17:
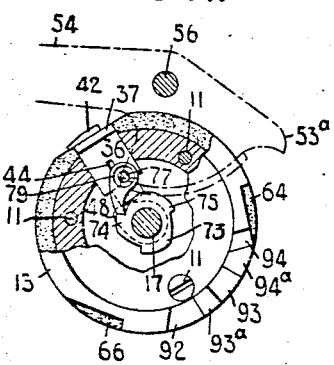

In the accompanying drawings, Figure 1 is a right-hand side elevation of the upper part of a Smith Premier typewriter machine to which my invention is shown as applied, the right-hand platen finger wheel being sectioned away. Fig. 2 is a longitudinal central sectional view of the platen showing the mounting of the latter and various coöperating devices. Fig. 3 is an enlarged fragmentary plan view showing part of the platen and one of the combined clamping stop members. Fig. 4 is a fragmentary plan view showing the platen, the main feed roller and the combined clamping and stop members. Fig. 5 is a right-hand end view of the platen showing the platen head partly broken away to expose the interior of the platen, other parts being shown in section and the supplementary line spacing lever being shown in dotted lines. This view shows the platen in what may be termed its initial position or that position in which the bill or work sheet is introduced into the machine. Figs. 6 and 7 are views similar to Fig. 5, but showing some of the parts in different relations from those in which they appear in said Fig. 5, other parts shown in the latter figure being omitted. Figs. 8 and 9 show respectively a right-hand end view of the platen and a fragmentary corresponding rear view of the platen and the regular line spacing pawl. Figs. 10 and 12 show views similar to Fig. 8, the parts being shown in different stages of operation from those in which they appear in said Fig. 8, whereas Figs. 11 and 13 show views similar to Fig. 9 but show the parts as they appear at different stages of the operation. Figs. 14 and 15 are views resembling Fig. 5, but showing the parts in different relations from those in which they appear in the first named figure. Figs. 16 and 17 are also views resembling Fig. 5 but showing still other stages in the operation of the parts.

Referring first more especially to Figs. 1 and 2, the main frame of the machine comprises corner posts 1 sustaining a top plate 2 on which are oppositely disposed front and rear grooved track-ways numbered respectively 3 and 4. These track-ways receive anti-friction balls 5 which also coöperate with the grooved front bar 6 and rear bar 7 of a carriage truck, the latter also comprising side or end bars 8. A platen comprising the usual wooden core 9 and external sheath 10 of rubber or the like has secured to its ends by the usual wood screws 11 platen heads 12 and 13, the left-hand platen head 12 being provided with an elongated hub or boss 14. The platen axle in the present case preferably is composed of two sections, a comparatively short left-hand section 15, the inner end of which terminates within the hub 14 of the left-hand platen head, the axle section 15 being fixed to the hub by a screw 16 and consequently being at all times maintained in a fixed relation with the platen. The outer end of the axle section 15 bears on and projects beyond the left-hand side bar 8 of the carriage truck and is provided with a finger wheel (not shown) through which the platen may be rotated in line spacing direction at will. The other axle section 17 abuts at its left end the shorter section 15 and extends through the platen from left to right, passing through the right-hand platen head 13 and having a bearing on the right-hand side bar 8 of the carriage truck. The outer end portion of the axle section 17 may carry a finger wheel of the usual construction. The axle section 17 is not fixed to the platen, so that relative turning movements between the section 17 and the platen may be effected, the section having a bearing on each of the platen heads 12 and 13. The axle sections are journaled on a platen frame or carrier which comprises left and right-hand end or side plates numbered respectively 18 and 19, said side plates being connected by a front bar 20 and a rear bar 21. Studs 22 project laterally outward from the end plates of the platen frame and are engaged by hooked links 23 pivoted at 24 to the carriage truck. It will be understood that the platen carriage comprises the truck and the platen frame or carrier, and that the latter, together with the platen, is adapted to be rocked on the truck to expose the writing. It will further be understood that the platen carriage is connected with the usual spring drum mechanism and is controlled by the usual escapement devices so that at each printing operation the platen and platen carriage may be drawn a letter space distance leftward across the top plate on the track-ways 3 and 4 under the influence of the spring drum mechanism. The rear bar or rod 21 of the platen carrier fixedly supports upwardly extending standards or arms 25 to which is suitably secured a paper table 26 of the usual construction. Links 27 (Fig. 1) are pivoted to and depend from the rear bar or rod 21, said links carrying a rod or shaft 28 (Fig. 4) on which is mounted a main feed roller comprising, in the present instance, a metal core 29 rotatable on the rod or shaft 28, said core carrying a plurality of feed roll sections 30 of rubber or the like. The links 27 at their lower ends carry a rod 31 (Fig. 1) which pivotally supports a paper plate 32 of the usual construction, the latter being held in contact with the platen or the paper thereon by the lower rear end portions of paper fingers 33 which are secured to sliding arms 34 mounted on the front bar or rod 20 of the platen carrier. The main feed roller is normally maintained in contact with the platen or the paper thereon by the usual or suitable leaf springs 30ª.

The paper feeding and controlling devices above referred to are substantially the same as those found on the Smith Premier machine and need not be herein described at greater length.

Referring now to the novel stop and clamp members and their mounting, the sheath 10 of the platen is flattened substantially throughout its length as indicated at 35 in Figs. 2 and 3 and in various of the operating views. Holes are formed in the platen through the flattened portion 35, these holes receiving cup-like casings or housings 36 which are provided with elliptical flanges 37, the latter being received in counter-sinks in the flattened portion 35, so that the outer faces of the flanges are flush with the surface of the flattened portion.

Each housing or casing 36 is secured to the platen by wood screws 38 which pass through the flanges 37, one at each side of the body of the housing, the flanges being countersunk to receive the heads of said screws which are flush with the outer faces of the flanges. The interior of each housing is bored out, as indicated at 39 (Fig. 2) and receives a plunger-like clamping and stop member comprising a stem 40, a head 41 and an angularly disposed flattened clamping lip 42 beveled on its outer face from the free end of the lip to the end thereof which connects with the stem 40 as shown in Fig. 15 for instance. The clamping lip 42 is arranged exteriorly of the platen and the stem 40 passes downwardly through an opening in the housing and extends through the bore 39 thereof. The head 41 slidably fits the bore 39 and is secured in place on the stem by a cross pin 43, the end portions of which project oppositely from the head 41 and are received and guided in slots 44 formed at the opposite sides of the housing, thereby preventing rotary movements of the member in its housing. A coiled spring 45 surrounds the stem 40 within the bore 39 of the housing and is confined between the wall at one end of the bore of the housing and the head 41 of the plunger-like member. Any desired number of plunger-like members may be employed although as shown in the drawings I prefer to make use of four such members, these being arranged in a straight line lengthwise of the platen and parallel with the axis thereof and each being movable radially of the platen. The coiled springs 45 tend to maintain the lips of the plunger-like members in contact with the platen but the members are adapted to be pressed outwardly radially of the platen, compressing the springs 45 and forcing the lips 42 away from the surface of the platen and exposing parts of the stems 40, as indicated in Fig. 5. The purpose of moving the clamping lips away from the platen and moving the stems 40 outwardly to expose their outer ends is to position the plunger-like members for proper coöperation with the bill sheet as will be subsequently explained at greater length.

The preferred means for moving the clamping and stop members relatively to the platen will now be described. A plurality of cam members 46, one for each of said members, are arranged on the axle section 17 and are secured to said section by pins 47 so that the nose 48 of each cam member 46 is adapted to coöperate with the head 41 of one of the plunger-like members, although the lower cylindrical portion of the cam is always free from contact with the plunger. To the right of the right-hand side bar 8 of the carriage truck a pinion 49 is secured to the axle section 17 by a cross pin 50 (Figs. 1 and 2). The teeth 51 of the pinion 49 mesh with the teeth 52 of a gear segment 53 which segment forms a plate-like arm of a lever, the other arm 54 of which is angularly disposed, inclining forward and terminating in a handle or finger piece 55 by which the lever may be controlled by the hand of the operator. The hand-controlled lever just referred to is provided with a pivot or fulcrum pin comprising a body portion 56, an enlarged portion 57 and a reduced end portion 58 with which the enlarged portion forms a shoulder 59 (Fig. 2). The hand-controlled lever is in the nature of a line spacing lever supplementary to the usual line spacing lever as will be later fully explained. Said supplementary line spacing lever is perforated to fit over the reduced portion 58 and against the shoulder 59 of the fulcrum pin. After the lever is in place on the reduced portion 58 of the pivot pin the end of the portion 58 is upset or spread as indicated at 60, which operation serves to fix the pivot pin and the lever together. The body portion 56 of the pivot pin is journaled in a cylindrical boss, enlargement or bearing 61 formed integrally with the right-hand end plate 19 of the platen carrier. The left-hand face of the enlargement 57 of the pivot pin abuts against the right-hand face of the boss 61 and the left-hand end portion of the body 56 of the pivot pin projects beyond the left-hand face of the boss 61 and has fixed to it by a cross pin 62 an arm or stop member 63 (see Figs. 2, 5, 6 and 7) the side of which abuts against the left-hand face of the boss 61. The construction is such that while the pivot pin may turn freely in its bearing it is held from moving endwise thereof. The stop arm 63 is adapted to coöperate with a plurality of notches formed in the periphery of the platen head 13, three notches being shown in the drawings and numbered for convenience of description 64, 65 and 66 (Fig. 7) Each notch has a short side which may be termed its working side or face and which is substantially radial of the platen and a longer side at right angles to the short radial side. A wire spring 67 is coiled around the enlargement 61 (Figs. 1 and 2) and around the part 57 of the pivot pin, said spring being confined between the supplementary line space lever and the right-hand side bar 19 of the platen carrier. One end of the spring is hooked over a pin 68 projecting laterally from the right-hand side bar 19 and the other end is hooked over a shank of a headed screw 69 projecting inwardly from the lower arm or gear portion 53 of the supplementary lever. The spring 67 continues to turn the lower arm 53 of the lever forwardly and normally maintains a nose or curved stop portion 53ª on the lever in engagement with the tops of the gear teeth 51 on the pinion 49. The nose 53ª is formed at the lower rear side of the plate-like arm 53 and contiguous to the gear teeth 52, said nose having its working portion, or that face which is contactive with the gear teeth 51 curved to conform to the circle containing the tops of said gear teeth. The construction is such that the contact face of the nose or stop 53ª is adapted to engage the tops of a plurality of the gear teeth 51 and thereby to effectively stop a further movement of the supplementary line space lever under the force constantly exerted by the spring 67.

The normal position of the supplementary line space lever is illustrated in Fig. 1, and it will be understood that the upper arm 54 of said lever may be pulled forward by the handle 55, causing the gear teeth of the segment 53 or lower arm of said lever to coöperate with the teeth 51 of the pinion 49 to turn the axle section 17 to which said pinion is secured. It will be further understood that when the handle 55 is released the supplementary line space lever will be restored to normal position automatically by the spring 67 and the pinion 49 and the axle section 17 will be returned or restored to the positions from which they started. The supplementary line space lever has a constant or unvarying throw or movement, this movement being limited in one direction by the coöperation of the nose 53ª with the tops of the pinion teeth 51 and in the opposite direction by the coöperation of the pawl or stop member 63 with one or another of the notches formed on the periphery of the platen head 13, which last named coöperation will be explained in detail hereafter. The gear segment is so proportioned that when the stop member 63 is brought into coöperation with the platen head 13 to effect the positive arrest of the lever, the teeth near the forward end of the gear segment 53 will be in mesh with the pinion teeth 51. From what has been said it will be apparent that the shaft or axle section 17 and the cam members 46 on said axle section may be given an unvarying extent of forward and backward rotation under impulses received from the supplementary line space lever and its restoring spring 67, and that by reason of the gear connection between the supplementary line space lever and the axle section 17 said axle section and the cam members 46 fixed thereon have a single normal position. This normal position of the shaft and cam members is illustrated in Fig. 5.

Means are provided for connecting the shaft or axle section 17 with the platen so that the rotary movements communicated to the axle section 17 in one direction may be transmitted to the platen. The connecting means between the platen and the axle section 17 comprises a small ratchet wheel 70 having a collar portion 71 which is fixedly connected with the axle section 17 by a pin 72 (Fig. 2). The ratchet wheel 70 abuts the inner face of the platen head 13 and as clearly shown in various of the operating views said ratchet wheel is provided with three ratchet teeth, said teeth being numbered 73, 74 and 75 and each comprising a short radial working face and a longer curved face connecting the working face with the working face of an adjacent tooth. Coöperating with the teeth of the wheel 70 is a pawl 76, which as shown in Fig. 2 is pivoted on a headed shoulder screw 77 which is screwed into the platen head 13 and projects inwardly therefrom. A depression 78 is formed in the inner face of the platen head 13 surrounding the shouldered portion of the screw 77 and a corresponding depression 79 is formed oppositely in the pawl 76. The depressions 78 and 79 register and form a housing for a wire spring 80 which surrounds the screw 77 within the housing and has one of its ends fixed to the platen head and its other end fixed to the pawl. The spring 80 tends to maintain the pawl 76 in engagement with one or another of the teeth of the ratchet wheel 70. It will be understood that when the axle section 17 is turned in line spacing direction the ratchet wheel 70 will be turned with it, causing the short working face of one or another of the teeth of the ratchet wheel to engage with the end portion of the pawl 76 in such a way as to force said pawl ahead and to cause a rotary movement of the platen head 13 on which said pawl is mounted as well as a corresponding rotary movement of the platen. This feature of the invention will be more fully explained later on; at this place it is only necessary to call attention to the fact that when the handle 55 of the supplementary lever is pulled forward, turning said lever on its fulcrum, the operation serves not only to communicate rotary movements to the axle section 17 but also to cause rotary movement of the platen by reason of the ratchet and pawl connection 70, 76 between the axle section 17 and the platen.

Besides the means just described for communicating rotary movements to the platen, other and independent platen turning means are provided. The latter means comprises the suitable devices for coöperating with the platen and include a rock shaft 81 journaled on the right-hand side bar 8 of the carriage truck, said rock shaft at its forward end carrying a line spacing handle 82 and having fixed to its rear end by a pin 83 a cylindrical pawl-housing 84 (Figs. 1 and 2). The housing is bored out to receive a plunger-like pawl carrier comprising a stem 85 and a head 86, the latter terminating in a pawl tooth 87. A cross pin 88 passes through the head 86 and projects beyond the surface thereof, the end portions of the cross pin engaging in slots 89 formed lengthwise of the housing 84. A coiled spring 90 surrounds the stem 85 and serves to normally maintain the cross pin 88 in contact with the top of the slots 89, as shown in Fig. 1 and to maintain the pawl projected. A coiled restoring spring 91 serves to maintain the rock shaft 81 and the parts fixed to it in the relations shown in Figs. 1 and 2, said rock shaft and the parts fixed to its ends composing a line spacing lever. It will be noted that the pawl tooth 87 is normally maintained a short distance away from the face of the platen head 13.

The line spacing or platen rotating devices thus far described, including the rock shaft 81 and the parts carried by it, resemble generally the corresponding parts found on the Smith Premier machine. In the present instance the pawl tooth 87 is adapted to coöperate with crown ratchet teeth formed by notches 92, 93 and 94 cut in the face of the platen head 13. The shapes of the notches and the ratchet teeth formed thereby are best shown in Figs. 8 to 13 inclusive. In these figures the dotted lines $a$ and $b$ indicate respectively the beginning and end of the travel of the pawl tooth 87, the path of travel of said tooth being in part arcuate and having as its center the axis of the rock shaft 81. The base of the notch 92 is so shaped that when it has been brought to position to be engaged by the pawl tooth 87 (as shown in Fig. 8) said base will be horizontal. The top of this notch 92 may be radial as may be the base and top of the next succeeding notch 93. The base of the next notch 94, however, is sharply inclined so that the tooth formed between the notches 93 and 94 has one side substantially radial and the other side sharply inclined thereto, the construction being such that the outer wall of the tooth is much longer than the inner wall. For convenience of description this tooth will be numbered 94$^a$ while the tooth preceding will be numbered 93$^a$. It will be noted that the notches 92, 93 and 94 and the teeth formed between them are comparatively close together so that the greater part of the outer face of the platen head 13 is smooth and in the same plane as the crowns of the teeth 93$^a$ and 94$^a$ and the pawl tooth 87 will not coöperate with the smooth part to effect a turning of the platen. When, however, the platen has been turned so that the notches 92, 93 and 94 are within the path traveled by the pawl tooth 87, it will be apparent that an operation of the line spacing lever 82 will cause said pawl tooth to coöperate with one or another of the crown ratchet teeth on the platen head 13 to effect a turning movement of the platen to a greater or less extent.

As has been said my improvements are especially adapted to billing work. The particular embodiment of my invention which has been illustrated and described is especially designed for a form of bill known as an express way-bill and used by express companies in billing merchandise to be carried. It has not been deemed necessary to illustrate the bill sheet in the present instance, it being sufficient to say that said bill sheet has blank spaces on four different lines variably spaced apart and which are required to be filled.

Referring now to the mode of operating my improvements in filling in a way-bill of the character described, it will be recalled in the first place that the axle section 17 and the cam members 46 normally occupy the positions illustrated in Fig. 5. If the platen and the parts mounted on it do not happen to occupy the positions shown in this view the operator may, preliminary to introducing the first bill into the machine, grasp the left-hand platen finger wheel which is fixed to the axle section 15 and turn the latter, causing the platen to rotate in line spacing direction until the combined clamping and stop members occupy the positions shown in Fig. 5. During this rotary movement of the platen the axle section 17 and the cam members 46 will remain motionless so that the inner ends of the heads 41 of the combined clamping and stop members will be brought into contact with the noses 48 of the cam members, the result being that said combined members will be automatically forced outward radially of the platen until they reach the positions illustrated in Fig. 5. The lower edge portions of the paper table 26 which lie in the paths of the lips 42 are cut away as indicated at 26$^a$ (Fig. 5) in order that the lips may pass freely therethrough and not to obstruct the turning movements of the platen. The spaces 30$^b$ (Fig. 4) which divide the feed roller are likewise provided to afford a free passage of the lips 42 so that the feed roller will not be displaced by the lips and the feed roller will not interfere with the turning movement of the platen. From an inspection of Fig. 5 it will be noted that the clamping portion or lip 42 of each clamping and stop member lies when forced outward to the limit of its movement under and close to the paper table 26 and forms practically a continuation thereof, so that the way-bill or work sheet may be introduced into the machine over the paper table and forward of the lips 42 and its leading edge will be directed into engagement with the exposed or working portions of the stems 40 which perform the functions of stops or gaging means for the leading edge of the bill sheet or that edge first wholly introduced into the machine and serve to properly square or aline said bill sheet when it is passed downwardly into contact with said stems 40 between the lips 42 and the flattened portion 35 of the platen and to assure the introduction or entering of the work sheets always at the same point or line. After the bill sheet has been properly alined the operator may grasp the handle 55 and pull it forwardly, causing a rotation of the supplementary line spacing lever. During this movement of the lever from the dotted line position indicated in Fig. 5 to that indicated in Fig. 6, the axle section 17 will be turned, carrying the noses 48 of the cam members out of engagement with the heads 41 and permitting the springs 45 to force the combined clamping and stop members inwardly, causing the lips 42 to engage with the bill sheet at its leading edge portion and clamp said bill sheet securely against the platen. During this initial stage of the rotation of the supplementary line spacing lever just described, the platen will remain motionless, the pawl 76 riding over the back of the tooth 74 of the ratchet wheel 70. The parts are arranged so that immediately after the lips 42 have been moved inward to operative position the short radial working face of the ratchet tooth 73 will be brought into engagement with the pawl 76, as illustrated in Fig. 6. The result will be that during the completion of the rotation of the supplementary line space lever—that is in its movement from the dotted line position of Fig. 6 to the position indicated in Fig. 7—the ratchet tooth 73 will coöperate with the pawl 76 to connect the axle section 17 with the platen and the latter will be turned with the axle section from the position illustrated in Fig. 6 to that of Fig. 7. It will be noted that this brings the clamping lips 42 forwardly past the under side or bottom of the platen against which the printing takes place, or past the printing line, and from an inspection of Fig. 4 it will be understood that the clamping lips 42 during their movement from initial position to that of Fig. 7 pass either between or at one side of the sections 30 which compose the main feed roller. The limit of the downward movement of the supplementary spacing lever is determined by the engagement of the stop member 63 with the short radial side of the notch 64 in the periphery of the platen head 13 and this engagement of the member 63 with the radial side of the notch 64 also limits the turning movement of the platen and prevents overthrow thereof. This will be understood from an inspection of Fig. 7.

By the full movement of the supplementary lever the bill sheet has been fed forward into position for receiving the first item or line of writing, and said lever may now be released and automatically restored by its spring to the initial position illustrated in Fig. 5, this restoring movement as has been explained also carrying back the axle section 17 and the cam members 46 to initial position. During this return movement of the axle section and the cam members the platen will not be affected, it remaining in the position to which it has been turned by the forward movement of the supplementary lever, but the relation between the ratchet wheel 70 and the pawl 76 will be altered, the pawl riding over the backs of the teeth 74 and 75. The first line or item may be written by operating the printing instrumentalities in the usual way, and then the carriage may be retracted and the platen advanced or line spaced for receiving the second line of writing, by operating the usual line space handle 82. The result of this operation will be explained in connection with Figs. 8 to 11 inclusive. Figs. 8 and 9 correspond with Fig. 7, these two first mentioned figures showing the platen in the same position as does Fig. 7 but omitting various details shown in Fig. 7 and illustrating more clearly the crown ratchet teeth on the platen head 13. Referring first then to Figs. 8 and 9 it will be seen that when the platen is positioned for writing the first line of the bill the base of the notch 92 in the platen head is in position to be engaged by the pawl tooth 87 when the regular line space handle 82 is operated. When, therefore, this handle is operated after the completion of the first line, the pawl tooth 87 is forced inwardly and downwardly against the base of the notch 92, causing a turning movement of the platen from the position shown in Figs. 7, 8 and 9 to that shown in Figs. 10 and 11, thus advancing the bill sheet into position to receive the second line of writing. It will be noted that during the operation of the handle 82, the platen will be turned directly and not through its connection with the axle section 17, as was the case with the first turning movement in the cycle of operations now being described. The second line having been written the platen may be rotated from the position illustrated in Figs. 10 and 11 to that illustrated in Figs. 12 and 13 by again operating the handle 82. As the handle is turned the pawl tooth 87 will be forced inwardly against the face of the platen head 13 and will come into contact with the upper outer corner of the tooth 94ª, as will be understood from an inspection of Figs. 10 and 11. Because of the special and peculiar shape of this tooth the pawl tooth 87 will be prevented from engaging the notch 94, although the greater part of the base of this notch lies in the path of the pawl tooth, as indicated in Fig. 10. Being prevented from engaging with the notch 94 the pawl tooth will be forced to ride down over the face of the tooth 94ª until said pawl tooth drops into the notch 93 and engages with the tooth 93ª, as shown in Fig. 11. The platen, of course, during this initial stage of movement of the pawl tooth 87 will remain motionless until after the engagement of the pawl tooth with the crown tooth 93ᵃ takes place. Further movement of the pawl tooth will effect a turning of the platen to the position shown in Figs. 12 and 13, thereby advancing the bill sheet into position for receiving the third line of writing. The turning of the platen and the advance of the bill sheet by this last mentioned operation is much less than the movements previously effected by the handle 82. The turning movement of the platen just described is a direct one and is not communicated through the axle section 17. The third line of writing having been written, the platen may be turned and the bill sheet advanced for receiving the fourth line of writing by again operating the line space handle 82, causing the pawl tooth 87 to enter the notch 94 and engage the tooth 94ᵃ, and so turn the platen from the positions shown in Figs. 12 and 13 to that shown in Fig. 14. This movement of the platen will also be considerably less than the first two line spacing movements effected by the handle 82, so that the extent of angular movement transmitted to the platen at the last two described actuations of the handle is considerably less than the sum of two successive movements of the pawl 87 between the lines a and b. The way-bill, as has been stated, is in the present case a four line one so that when the fourth line has been filled in the bill is completed and the next operation is to feed it out of the machine and automatically unclamp it so that it may be withdrawn and a new bill sheet inserted. By the various direct rotary movements communicated to the platen through the line spacing handle 82 the platen has been turned, carrying the pawl 76 to the position shown in Fig. 14. During these direct turning movements of the platen the axle section 17 and the wheel 70 thereon will remain motionless, the pawl 76 riding over the backs of the teeth of the ratchet wheel. At this stage then the relation between the pawl 76 and the ratchet wheel 70 will be that shown in Fig 14, the pawl being in engagement with the back of the ratchet tooth 73.

In order to feed the bill sheet out of the machine and unclamp it, the supplementary line spacing lever is operated with the result that the axle section 17 and the ratchet wheel 70 are turned independently of the platen until the ratchet tooth 75 is brought into contact with the pawl 76, after which the pawl will be forced ahead and the platen turned until the movement of the supplementary line space lever is completed. The result will be that the platen will be turned from the position shown in Fig. 14 to that shown in Fig. 15. From an inspection of this latter figure it will be noted that the position of the platen corresponds with that shown in Fig. 5, but that the clamping lips 42 in Fig. 15 are operative, while in Fig. 5 they are inoperative. This difference is due to the fact that in Fig. 15 the supplementary line spacing lever is shown in depressed position and the axle section 17 and cam members 46 are consequently shown in abnormal position. When, however, the supplementary lever is released it will be restored to normal position as shown in Fig. 5 by its spring 67 without affecting the platen and at the same time will be turned backward to normal position. During the backward turning movement of the cam members the noses 48 thereon will contact with the heads 41 of the clamping and stop members and will force said last named members radially outward to the position shown in Fig. 5, thereby releasing the bill sheet so that it may be withdrawn, after which a new bill sheet may be inserted, advanced and written upon in the manner explained. It will be noted that during the last described opening of the clamping lips 42 the platen was motionless, the clamping lips being moved away from the platen by the turning movement of the cam members 46 under the impulse of the spring 67.

From what has been said it will be seen that the operation of introducing, squaring and clamping a bill sheet and then advancing it line by line for filling in blanks thereon, and then for further advancing it and unclamping it may be rapidly effected and comprises for a four line bill sheet, first a depression of the supplementary line spacing lever, then three operations of the regular line space mechanism and finally a second depression of the supplementary line space lever, which last operation not only feeds the bill out and unclamps it but positions the platen and the squaring and clamping means for receiving a fresh bill. Of course, it will be apparent that for a bill sheet having a greater or less amount of writing to be filled in the construction and arrangement of some of the parts would necessarily be altered and the operations above outlined would be varied to a greater or less extent. Any necessary changes in construction and operation for any particular style of bill may, however, be readily provided for from the description and explanation herein given. The particular embodiment of my invention above described may, however, itself be made use of in writing a two line bill sheet by dispensing with the use of the regular line spacing lever and turning the platen and advancing the bill sheet by operating only the supplementary line spacing lever. In employing the invention in this way the first steps correspond with those already described in connection with Figs. 5 to 7 inclusive. When the platen has been turned to the first line position, as shown in Fig. 7, the supplementary line space lever is released, returning to normal position and carrying with it the axle section 17 and the cam members 46 back to normal position. The parts will then be in the positions illustrated in Fig. 16. From a consideration of this figure it will be noted that the pawl 76 is in contact with the back of the tooth 75. After the first line has been written the automatic line spacing lever is again depressed, causing a rotation of the ratchet wheel 70 and bringing the working face of the tooth 74 into coöperation with the pawl 76, causing a turning movement of the platen from the position shown in Fig. 16 to that shown in Fig. 17. The platen will be arrested in the position shown in the latter figure by the coöperation of the stop member 63 with the notch 65 in the periphery of the platen head 13, and the bill sheet will be advanced into position for receiving the second line of writing. When the supplementary line space lever is released from the position shown in Fig. 17 it will return to normal position in the usual way and the axle section 17 and the ratchet wheel 70 will be turned back to normal position. During this backward turning movement the pawl 76 will ride over the ratchet tooth 75 and will be forced by its spring down on the back of the ratchet tooth 74 in advance of the short working face of the ratchet tooth 75. When the second line has been written and the supplementary lever is again operated the ratchet wheel 70 will be turned, turning the working face of the tooth 75 into engagement with the pawl 76 and forcing the latter ahead, thereby causing the platen to turn until it reaches the position shown in Fig. 15 where it will be arrested by the coöperation of the stop 63 with the notch 66 in the platen head.

It will be understood that by operating my invention in the way last described, a two line bill sheet may be properly entered, clamped, advanced step-by-step and then fed forwardly out of the machine and unclamped.

It will be seen that by my invention I provide a stop and a clamp or a plurality or set of stops and clamps which in the present case are mounted on the platen and are movable radially thereof; that the plurality of clamping and stop members are independently movable, so that if one of them encounters an inequality in the work sheet or is obstructed in any way the effective operation of the other members is not interfered with or impeded as would be the case were said members not independently mounted; that the actuating means for moving the stops and clamps comprise cam members which are mounted on a shaft or axle section rotatable relatively to and independently of the platen, said shaft or axle section having a single normal position; that in the present case a member or members each combining the functions of a stop and clamp are employed; and that the actuating devices or cam members may be caused to coöperate with the combined clamping and stop members in either of two ways, in one of which ways the actuating devices or cam members remain motionless and as the platen is turned the clamping and stop members are caused to engage with the motionless cam members and are automatically forced outward thereby during the rotation of the platen, and in the other of which ways the platen and the clamping and stop members remain motionless while the shaft or axle section is turned to bring the cam members thereon into coöperation with the motionless clamping and stop members.

Any suitable means for performing the function of a side guide or gage for the work sheet or bill may be employed in connection with the novel end stops and clamps. In Figs. 1 and 2, for example, a side guide 95 of wire is shown secured to the end bar or plate 19 of the platen frame by a screw 96 in position to coöperate with the righthand side edge of the work sheet when it is introduced into the machine. The side guide 95 *per se* is not claimed herein by me.

It will be understood that although the stops and clamps for the leading edge of the work sheet are shown combined, yet if for any reason it is desired to separate them, stop members separate from the clamping members may be provided.

Various other changes may be effected within the scope of the invention and parts of it may be made use of while at the same time other parts are dispensed with.

What I claim as new and desire to secure by Letters Patent, is:—

1. In a typewriting machine, the combination of a platen, a plurality of independently movable paper stops, and means connectible with the platen for automatically moving said stops relatively to the platen to position them to coöperate with an edge of the paper or work sheet, said means being also disconnectible from the platen.

2. In a typewriting machine, the combination of a platen, a plurality of independently movable paper stops, and means for automatically moving said stops relatively to the platen during rotary movements of the platen to position them to coöperate with an edge of the paper or work sheet, said means including an axle for said platen rotatable independently of the platen, and disconnectible connections between said platen and said axle.

3. In a typewriting machine, the combination of a platen, a plurality of independently movable paper clamps, and means for automatically moving said clamps relatively to the platen, said means including an axle for said platen rotatable independently of the platen, and disconnectible connections between said platen and said axle.

4. In a typewriting machine, the combination of a platen, a plurality of independently movable paper clamps, and means for automatically moving said clamps relatively to the platen during rotary movements of the platen, said means including an axle for said platen rotatable independently thereof, disconnectible connections between said platen and said axle, and devices on said axle coöperative with said paper clamps.

5. In a typewriting machine, the combination of a platen, a plurality of independently movable leading edge stops arranged on the platen in a line lengthwise thereof, and means for automatically moving said stops relatively to the platen into position to coöperate with the leading edge of the work sheet or that edge first introduced into the machine, said means including an axle for said platen rotatable, independently thereof, disconnectible connections between said platen and said axle, and devices on said axle coöperative with said paper stops.

6. In a typewriting machine, the combination of a platen, a plurality of independently movable leading edge stops arranged on the platen in a line lengthwise thereof, and means for automatically moving said stops relatively to the platen during rotary movements of the platen into position to coöperate with the leading edge of the work sheet or that edge first introduced into the machine, said means including an axle for said platen rotatable independently thereof, disconnectible connections between said platen and said axle, and devices fixed to said axle and coöperative with said stops.

7. In a typewriting machine, the combination of a platen provided with a plurality of openings, paper stops movable in said openings independently of each other, and means for simultaneously moving said stops into and out of operative position, said means including an axle on which said platen is mounted, and disconnectible connections between said axle and said platen.

8. In a typewriting machine, the combination of a platen provided with a plurality of openings, paper stops movable in said openings independently of each other, and means for automatically moving said stops into and out of operative positions simultaneously, said means including a shaft or axle on which said platen is adapted to rotate, means for turning said shaft independently of said platen, and disconnectible connections between said shaft and said platen.

9. In a typewriting machine, the combination of a platen, a plurality of independently movable paper clamping members arranged on the platen in a line lengthwise thereof, and means for automatically moving said members relatively to the platen into receiving positions for the work sheet, said members coöperating with the work sheet at the edge first introduced into the machine, said means including a shaft or axle on which said platen is adapted to rotate, means for turning said shaft independently of said platen, and disconnectible connections between said shaft and said platen.

10. In a typewriting machine, the combination of a platen, a plurality of independently movable paper clamping members arranged in a straight line lengthwise of the platen, and means for automatically moving said members relatively to the platen during rotary movements of the platen into receiving positions for the work sheet, said members coöperating with the work sheet at the edge first introduced into the machine, said means including an axle or shaft on which said platen may rotate and which is rotatable independently of said platen, devices fixed on said shaft and coöperative with said members, and devices for connecting the shaft and platen so that they are caused to turn together in one direction but are disconnected when said shaft is turned in the opposite direction.

11. In a typewriting machine, the combination of a platen carrier, a platen axle rotatable thereon, a platen rotatable on said axle, a paper clamp, a device on said axle coöperative with said clamp, and a pawl and ratchet connection between said platen and said axle.

12. In a typewriting machine, the combination of a platen carrier, a platen axle rotatable thereon, a platen rotatable on said axle, a spring-pressed paper clamp, a cam fixed on said axle and coöperative with said clamp, and a pawl and ratchet connection between said platen and said axle.

13. In a typewriting machine, the combination of a platen carrier, a platen axle rotatable thereon, a platen rotatable on said axle, a spring-pressed combined paper stop and clamp member supported on said platen, a cam fixed to said axle and coöperative with said member, and a pawl and ratchet connection between said axle and said platen.

14. In a typewriting machine, the combination of a platen frame, a platen axle thereon, means tending constantly to turn said axle in one direction, a stop operative to normally position said axle, a platen on said axle, a paper clamp jointly controlled by said platen and said axle, and connections between said axle and said platen operative in only one direction of movement.

15. In a typewriting machine, the combination of a platen frame, a platen axle thereon, means tending constantly to turn said axle in one direction, a stop operative to normally position said axle, a platen on said axle, a paper clamp on said platen, means on said axle for operating said paper clamp, and connections between said axle and said platen operative in only one direction of movement.

16. In a typewriting machine, the combination of a platen carrier, an axle rotatable thereon, a spring constantly urging said axle in one direction, a stop normally positioning said axle, a platen on said axle and connected therewith so as to be turned in only one direction by said axle, a combined paper stop and clamp spring-mounted on the platen, and a cam on said axle operative on said combined stop and clamp.

17. In a typewriting machine, the combination of a platen carrier, a platen axle rotatable thereon, a spring constantly urging said axle in one direction, a stop normally positioning said axle, a pawl and ratchet connection between said axle and said platen, a combined paper stop and clamp spring-mounted on the platen, and a cam on said axle operative on said combined stop and clamp.

18. In a typewriting machine, the combination of a platen carrier, an axle rotatable thereon, a platen rotatable on said axle, a disconnectible connection between said platen and said axle, a paper clamp jointly controlled by said platen and said axle, a hand lever on said platen carrier, and a gear connection between said hand lever and said platen axle.

19. In a typewriting machine, the combination of a platen carrier, an axle rotatable thereon, a platen rotatable on said axle, a disconnectible connection between said platen and said axle, a paper clamp jointly controlled by said platen and said axle, a hand lever on said platen carrier, a gear connection between said hand lever and said platen axle, a spring constantly urging said hand lever in one direction and said platen axle in one direction, and a stop for normally positioning said hand lever and said platen axle.

20. In a typewriting machine, the combination of a rotary platen formed with a plurality of openings, a plurality of spring-pressed stops independently movable in said openings coöperative with an edge of a work sheet to square the latter, and automatic means for moving said stops outwardly so as to bring them into operative positions at a predetermined point in the rotation of the platen, said automatic means comprising a plurality of cams, spring means constantly operative on said cams, and stop means for arresting said cams in a predetermined normal position.

21. In a typewriting machine, the combination of a rotary platen formed with a plurality of openings, a plurality of spring-pressed stops independently movable in said openings and coöperative with an edge of a work sheet to square the latter, and means for moving said stops outwardly so as to bring them into operative positions at a predetermined point in the rotation of the platen, said means comprising a shaft, a plurality of cams fixed thereon, spring means constantly tending to turn said shaft in one direction, and stop means operative to normally position said shaft.

22. In a typewriting machine, the combination of a rotary platen formed with a plurality of openings, a plurality of spring-pressed paper clamps independently movable in said openings whereby the said clamps are adapted to coöperate with an edge of a work sheet to hold the latter in fixed relation with the platen, and automatic means for moving said clamps in said openings at a predetermined point in the rotation of the platen, said automatic means comprising a plurality of cams, spring means constantly operative on said cams, and stop means for arresting said cams in a predetermined normal position.

23. In a typewriting machine, the combination of a rotary platen formed with a plurality of openings arranged in a line lengthwise thereof, a plurality of spring-pressed members independently movable in said openings and each serving as a combined paper stop and paper clamp, and automatic means for moving said members in said openings at a predetermined point in the rotation of the platen, said automatic means comprising a shaft, a plurality of cams fixed thereon, spring-means constantly tending to turn said shaft in one direction, and stop means operative to normally position said shaft.

24. In a typewriting machine, the combination of a rotary platen formed with a plurality of openings arranged in a line lengthwise thereof, a plurality of spring-pressed members independently movable in said openings and each serving as a combined paper stop and paper clamp, and means for moving said members in said openings at a predetermined point in the rotation of the platen, said automatic means comprising a shaft, a plurality of cams fixedly secured to said shaft and operative when in normal position to hold said members so that the paper stops are operative and the paper clamps inoperative when said members are brought into coöperation with said cams and spring and stop devices adapted to position said cams in normal position.

25. In a typewriting machine, the combination of a platen, a paper stop coöperative with that edge of a work sheet first introduced into the machine, and means separate from and coöperative with the paper stop for actuating it, said means being capable of rotation with the platen, and devices by which the paper stop operating means are disconnected from the platen during rotary movements of said platen.

26. In a typewriting machine, the combination of a rotary platen having an axle, a paper stop mounted on said platen, means controllable by said axle for moving said paper stop relatively to the platen, and two sets of devices each operative independently of the other to turn the platen, and connections between one only of said sets of devices and said axle.

27. In a typewriting machine, the combination of a rotary platen having a relatively rotatable axle, a paper stop mounted on said platen, and means controllable by the rotation of said axle for moving said paper stop relatively to the platen.

28. In a typewriting machine, the combination of a platen, a paper clamp coöperative with the platen to hold that edge of a work sheet first introduced into the machine, and means independent of said paper clamp for automatically actuating it, said means being capable of rotation with the platen and also being capable of disconnection from the platen.

29. In a typewriting machine, the combination of a rotary platen having an axle, a paper clamp on said platen, means controllable by said axle for moving said paper clamp relatively to the platen, and means for freely turning said axle independently of said platen to operate said paper clamp.

30. In a typewriting machine, the combination of a rotary platen having a relatively rotatable axle, a paper clamp on said platen, and means controllable by said axle for moving said paper clamp relatively to the platen.

31. In a typewriting machine, the combination of a platen having an axle, a member serving as a combined paper stop and paper clamp, said member being mounted on said platen, means controllable by said axle for moving said member relatively to the platen, and means for freely turning said axle independently of said platen to operate said member.

32. In a typewriting machine, the combination of a rotary platen having a relatively rotatable axle, a member serving as a combined paper stop and paper clamp on said platen, and means controllable by said axle for moving said member relatively to the platen.

33. In a typewriting machine, the combination of a rotary platen having a relatively rotatable axle, a set of members mounted on the platen and each serving as a combined paper stop and paper clamp, and means fixed on said axle and coöperative with said members to move them relatively to the platen.

34. In a typewriting machine, the combination of a rotary platen provided with a plurality of openings arranged in a line lengthwise of said platen, said platen having a relatively rotatable axle, a plurality of spring-pressed stop and clamp members mounted in the openings in the platen, and a plurality of cams fixed on the platen axle operative to move said members in said openings.

35. In a typewriting machine, the combination of a rotary platen provided with an axle, said axle being rotatable independently of the platen, a paper stop, and means controlled by the relative movement between said axle and platen for actuating said stop.

36. In a typewriting machine, the combination of a rotary platen provided with an axle, said axle being rotatable independently of the platen, a paper clamp, and means controlled by the relative movement between said axle and platen for actuating said clamp.

37. In a typewriting machine, the combination of a rotary platen provided with an axle, said axle being rotatable independently of the platen, a paper stop, and means controlled by the relative movement between said axle and platen for automatically actuating said stop at a predetermined point in the relative rotation between the platen and axle.

38. In a typewriting machine, the combination of a rotary platen provided with an axle, said axle being rotatable independently of the platen, a paper clamp, and means controlled by the relative movement between said axle and platen for automatically actuating said clamp at a predetermined point in the relative rotation between the platen and axle.

39. In a typewriting machine, the combination of a rotary platen provided with two axle sections, one of which is fixed to the platen and the other of which is rotatable relatively to the platen, said platen carrying a plurality of paper stops, and means on the relatively rotatable section of the platen axle for controlling said members.

40. In a typewriting machine, the combination of a rotary platen provided with two axle sections, one of which is fixed to the platen and the other of which is rotatable relatively to the platen, said platen carrying a plurality of stop and clamp members, and means on the relatively rotatable section of the platen axle for controlling said members.

41. In a typewriting machine, the combination of a rotary platen provided with two axle sections, one of which is fixed to the platen and the other of which is rotatable relatively to the platen, said platen being provided with a plurality of openings arranged in a straight line lengthwise of the platen, a plurality of spring-pressed stop and clamp members arranged in the openings in the platen, and a plurality of cams fixed to the relatively rotatable section of the axle and operative to move said members.

42. In a typewriting machine, the combination of a rotary platen, a paper stop coöperative with one of the edges of the paper, and means adapted to be connected with the platen so as to receive motion from the platen and to move said paper stop, said means being adapted to be disconnected from the platen and moved to actuate said paper stop while the platen remains quiescent.

43. In a typewriting machine, the combination of a rotary platen, a paper stop coöperative with an edge of the work sheet, means adapted to be connected with the platen so as to receive motion therefrom and thereby to operate said paper stop, said means being adapted to be disconnected from the platen, and a hand controlled device operative to actuate said means to move said paper stop while the platen remains quiescent.

44. In a typewriting machine, the combination of a rotary platen, paper clamping means mounted thereon and adapted to move with the platen when the latter is rotated, and means for operating said clamping means to move the latter relatively to the platen into and out of operative position, said means being automatically rotatable by the platen and being also adapted to be disconnected from the platen and to be operated to move said clamping means while the platen remains quiescent.

45. In a typewriting machine, the combination of a rotary platen, paper clamping means coöperative with said platen to hold the paper thereagainst, two sets of devices, each set comprising actuating parts separate from the platen and each set being operative independently of the other to turn the platen, and means movable by one only of said sets of devices and operative when so moved to actuate said paper clamping means.

46. In a typewriting machine, the combination of a rotary platen, paper clamping means coöperative with said platen to hold the paper thereagainst, two sets of devices each set comprising actuating parts separate from the platen and each set being operative independently of the other to turn the platen, mechanism which may be moved to actuate said paper clamping means, and connections between one of said sets of devices and said mechanism, the other of said sets of devices being inoperative to move said mechanism.

47. In a typewriting machine, the combination of a rotary platen, a combined paper clamp and stop mounted on said platen and rotatable therewith about the platen axis, two separate sets of line spacing devices for rotating said platen in line spacing direction, a cam operative to move said paper stop and clamp, and connections between one of said sets of line spacing devices operative to move said cam to cause it to actuate said paper clamp and stop, the other of said sets of devices being inoperative to move said cam but operating to turn the platen and thereby bring the paper clamp and stop into coöperation with said cam.

48. In a typewriting machine, the combination of a rotary platen, a paper stop, a hand-actuated device, and means coöperative with said hand-actuated device to effect a rotation of the platen by a movement of said device in one direction and to actuate a stop by a movement of said device independently of said platen in another direction.

49. In a typewriting machine, the combination of a rotary platen, a paper clamp, a hand-actuated device, and means coöperative with said hand-actuated device to effect a rotation of the platen by a movement of said device in one direction and to actuate said clamp by a movement of said device independently of said platen in an opposite direction.

50. In a typewriting machine, the combination with a platen carrier and a rotary platen thereon, of a paper stop, a hand-actuated device, means for maintaining said device in a normal relation with said platen carrier, and means coöperative with said device to effect a rotation of the platen by a movement of said device from normal position, and to enable said device to move back to normal position without effecting a movement of the platen and to effect a movement of the stop during the movement of said hand-actuated device back to normal position.

51. In a typewriting machine, the combination with a platen carrier and a rotary platen thereon, of a paper clamp, a hand-actuated device, means for maintaining said device in a normal relation with said platen carrier, and means coöperative with said device to effect a rotation of the platen by a movement of said device from normal position and to enable said device to move back to normal position without effecting a movement of the platen and to effect a movement of the clamp during the movement of said hand-actuated device back to normal position.

52. In a typewriting machine, the combination with a platen carrier and a rotary platen thereon, of means for rotating said platen, means for maintaining said device in a normal relation with said platen carrier, a paper stop, and means under the control of the platen rotating means for moving said stop without effecting a rotation of the platen.

53. In a typewriting machine, the combination with a platen carrier and a rotary platen thereon, of means for rotating said platen, means for maintaining said device in a normal relation with said platen carrier, a paper clamp, and means under the control of the platen rotating means for moving said clamp without effecting a rotation of the platen.

54. In a typewriting machine, the combination of a rotary platen, stop means for coöperating with one of the edges of the paper or work sheet, and line space devices including a line space lever which is operative in one direction to communicate line space movements to the platen, said lever being operative in the opposite direction to actuate said stop means.

55. In a typewriting machine, the combination of a platen, stop means coöperating with one of the edges of the paper or work sheet, line space devices including a line space lever, means for actuating said stop means, and connections between the actuating means and said line space lever.

56. In a typewriting machine, the combination of a rotary platen, paper clamping means, and line space devices including a line space lever which is operative in one direction to communicate line space turning movements to the platen and in the opposite direction to actuate said clamping means.

57. In a typewriting machine, the combination of a rotary platen, paper clamping means, a line space lever for turning the platen in line spacing direction, actuating means for said clamping means, and connections between said lever and said actuating means.

58. In a typewriting machine, the combination of a rotary platen, combined stop and clamping means for the paper or work sheet, and line space devices including a line space lever operative in one direction to communicate line space turning movements to the platen and in the opposite direction to actuate said stop and clamping means.

59. In a typewriting machine, the combination of a rotary platen having an axle; a clamping and stop member for the paper or work sheet, said member being mounted on said platen, means on said axle for actuating said stop and clamp member, and means for actuating said axle, said last named means comprising a pinion fixed to the axle and a hand-controlled segmental gear coöperative with said pinion.

60. In a typewriting machine, the combination of a rotary platen having a relatively rotatable axle, a clamping and stop member mounted on said platen, means on said axle for actuating said member, connections between said platen and said axle, and means for actuating said axle, the last named means comprising a pinion fixed to the axle and a hand-controlled segmental gear meshing with said pinion.

61. In a typewriting machine, the combination of a rotary platen having a relatively rotatable axle, connections between said axle and said platen, hand-controlled means for turning said axle and said platen, and other hand-controlled means for turning said platen independently of said axle.

62. In a typewriting machine, the combination of a rotary platen having a relatively rotatable axle, hand controlled means for turning said axle, and connections between said axle and said platen such that when the axle is turned in one direction the platen is turned with it while when the axle is turned in the opposite direction the platen remains motionless.

63. In a typewriting machine, the combination of a rotary platen having a relatively rotatable axle, lost motion connections between said axle and said platen, and hand-controlled actuating means for said axle.

64. In a typewriting machine, the combination of a rotary platen having a relatively rotatable axle; connections between said platen and said axle, said connections comprising a ratchet wheel and a coöperating pawl, and means for actuating said axle.

65. In a typewriting machine, the combination of a rotary platen having a relatively rotatable axle, a ratchet wheel fixed to said axle, a coöperating pawl fixed to said platen, and means for actuating said axle, said last named means comprising a pinion fixed to the axle and a hand-controlled segmental gear meshing with said pinion.

66. In a typewriting machine, the combination of a rotary platen having a relatively rotatable axle, pawl and ratchet connections between said platen and axle, a combined clamping and stop member on said platen, means on said axle for actuating said member, and hand-controlled means for actuating said axle.

67. In a typewriting machine, the combination of a rotary platen having a relatively rotatable axle, connections between said platen and axle, means for actuating said axle comprising a pinion fixed thereto and a hand-controlled lever having a gear segment meshing with said pinion, a stop device carried by said lever, and stop devices on the platen coöperative with said stop device to arrest the platen and limit the extent of its turning movements.

68. In a typewriting machine, the combination of a rotary platen having a relatively rotatable axle, connections between said platen and axle, means for actuating said axle comprising a pinion fixed thereto and hand-controlled lever having a gear segment meshing with said pinion, a stop arm carried by said lever, and notches or depressions on the platen coöperative with said stop arm to limit the extent of turning movement of the platen.

69. In a typewriting machine, the combination of a rotary platen, a member operatively connected to said platen and provided with line spacing ratchet teeth, and a hand-controlled line spacing pawl coöperating with said ratchet teeth and having an arcuate path, the construction being such that at one operation of said pawl it passes over certain of said teeth lying in its path and at another operation said pawl engages the certain of said teeth referred to.

70. In a typewriting machine, the combination of a rotary platen, a member operatively connected to said platen and provided with line spacing ratchet teeth, and a hand-controlled line spacing pawl coöperating with said ratchet teeth, one of said teeth being so shaped that the pawl at one operation passes over the top of said tooth and is prevented by the outer corner of said tooth from operatively engaging therewith, although the working face of said tooth for the greater part lies in the path of said pawl, said pawl operatively engaging with said tooth at the next succeeding operation.

71. In a typewriting machine, the combination of a rotary platen having an axle, a line spacing ratchet wheel operatively connected with the platen independently of the platen axle, line spacing devices coöperative with said ratchet wheel to turn it in line spacing direction, and supplementary line spacing devices coöperative with the platen axle to turn said platen.

72. In a typewriting machine, the combination of a rotary platen having a relatively rotatable axle, connections between said axle and said platen, a line spacing ratchet wheel operatively connected with said platen independently of the platen axle, line spacing devices coöperative with said ratchet wheel, and supplementary line spacing devices operatively connected with said platen axle.

73. In a typewriting machine, the combination of a rotary platen, means for clamping the paper or work sheet to the platen, a finger piece, and means under control of said finger piece for turning the platen and for actuating said clamping means when the platen reaches a predetermined position, the finger piece being operable to actuate said clamping means independently of the rotation of the platen.

74. In a typewriting machine, the combination of a rotary platen, means for clamping the paper or work sheet to the platen, and means for controlling the operation of said clamping means at a predetermined position in the rotation of said platen either by or independently of the rotation of the platen.

75. In a typewriting machine, the combination of a rotary platen, means separate from or additional to the usual platen rotating means, for sweeping the platen through a predetermined extent of movement, a paper clamp, and means actuated by said first named means for automatically operating said clamp.

76. In a typewriting machine, the combination of a rotary platen, means including a hand lever and coöperative stops for sweeping the platen through a predetermined arc, a paper clamp, and means actuated by said hand lever for automatically operating said clamp.

Signed at Syracuse, in the county of Onondaga, and State of New York, this 14th day of March A. D. 1907.

ARTHUR J. BRIGGS.

Witnesses:
JOHN H. BARR,
LINWOOD A. MURRAY.